(12) United States Patent
Paig-Tran et al.

(10) Patent No.: US 11,161,067 B2
(45) Date of Patent: Nov. 2, 2021

(54) FILTRATION SYSTEM AND METHOD OF USE

(71) Applicants: Erin Winters-Mist Paig-Tran, Orange, CA (US); James Strother, Saint Augustine, FL (US); Raj V. Divi, Oakland, CA (US)

(72) Inventors: Erin Winters-Mist Paig-Tran, Orange, CA (US); James Strother, Saint Augustine, FL (US); Raj V. Divi, Oakland, CA (US)

(*) Notice: Subject to any disclaimer, the term of this patent is extended or adjusted under 35 U.S.C. 154(b) by 0 days.

(21) Appl. No.: 16/240,732

(22) Filed: Jan. 5, 2019

(65) Prior Publication Data

US 2020/0215468 A1   Jul. 9, 2020

(51) Int. Cl.
| | |
|---|---|
| *B01D 35/30* | (2006.01) |
| *B01D 35/157* | (2006.01) |
| *B01D 35/26* | (2006.01) |
| *B01D 33/01* | (2006.01) |
| *B01D 29/66* | (2006.01) |
| *B01D 36/00* | (2006.01) |
| *B01D 29/00* | (2006.01) |
| *B01D 29/44* | (2006.01) |

(52) U.S. Cl.
CPC ......... *B01D 35/30* (2013.01); *B01D 29/0095* (2013.01); *B01D 29/66* (2013.01); *B01D 33/01* (2013.01); *B01D 35/1576* (2013.01); *B01D 35/26* (2013.01); *B01D 36/00* (2013.01); *B01D 2201/287* (2013.01); *B01D 2201/31* (2013.01); *B01D 2201/60* (2013.01)

(58) Field of Classification Search
CPC .......... B01D 2029/033; B01D 35/1576; B01D 35/22; B01D 29/0095; B01D 2201/387; C02F 2201/002; C02F 2303/24
USPC .......... 210/321.72, 321.75, 321.84, 498, 422
See application file for complete search history.

(56) References Cited

U.S. PATENT DOCUMENTS

| | | | | |
|---|---|---|---|---|
| 4,193,503 A | * | 3/1980 | Connolly ............... | B01D 29/05 209/393 |
| 4,797,211 A | * | 1/1989 | Ehrfeld ................. | B01D 71/02 210/321.84 |
| 6,595,373 B1 | * | 7/2003 | Seifert ................ | B01D 33/275 210/488 |

* cited by examiner

*Primary Examiner* — Benjamin M Kurtz

(57) ABSTRACT

A filtration system includes a filtration device having filter slats positioned in a linear array and connected via a supporting structure, the filter slats being parallel to one another and being fixed at an angle relative to the linear array; and pores created by the filter slats; a fluid flow chamber to hold the filtration device such that fluid passes through the filtration device, the fluid flow chamber having a filtration channel with an inlet to receive fluid and an expulsion channel in fluid communication with the filtration channel; a filtrate channel in fluid communication with the filtration channel such that fluid passes through the filtration device between the filtration channel and the filtrate channel, the filtrate channel having a filtrate channel outlet; one or more pressure modulating structures in fluid communication with the fluid flow chamber such that the pressure modulating structure modifies pressure in the fluid flow chamber.

19 Claims, 9 Drawing Sheets

FILTRATION SYSTEM AND METHOD OF USE

BACKGROUND

1. Field of the Invention

The present invention relates generally to solid-fluid separation systems, including filtration systems, devices, and apparatuses, and more specifically to a filtration system and device with one or more pressure modulating structures in fluid communication with a fluid flow chamber such that the one or more structures modify pressure in the fluid flow chamber.

2. Description of Related Art

Filtration systems are well known in the art and are effective means to remove particles from water and/or other fluids. Conventional filtration systems include sieve filtration systems, cross-flow filtration systems, hydrosol filtration systems, and cyclonic separation systems, as well as others. Each of these systems includes limitations.

One problem commonly associated with conventional filtration systems is clogging and blocking of filtration pores, which reduces efficiency and causes additional maintenance of the system. For example, sieve filtration systems utilize one or more sieves with predetermined pore size. During use, fluid is passed through the sieve, wherein particles are blocked by the pore size. However, it is a common problem that the sieve pores become blocked during filtration due to the buildup of particles, thereby reducing the efficiency of filtration and requiring user maintenance.

Accordingly, although great strides have been made in the area of solid-fluid separation systems, many shortcomings remain.

It is an object of the present invention to provide an improved filtration system in which the pores are less likely to become blocked, thereby providing for improved efficiency.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
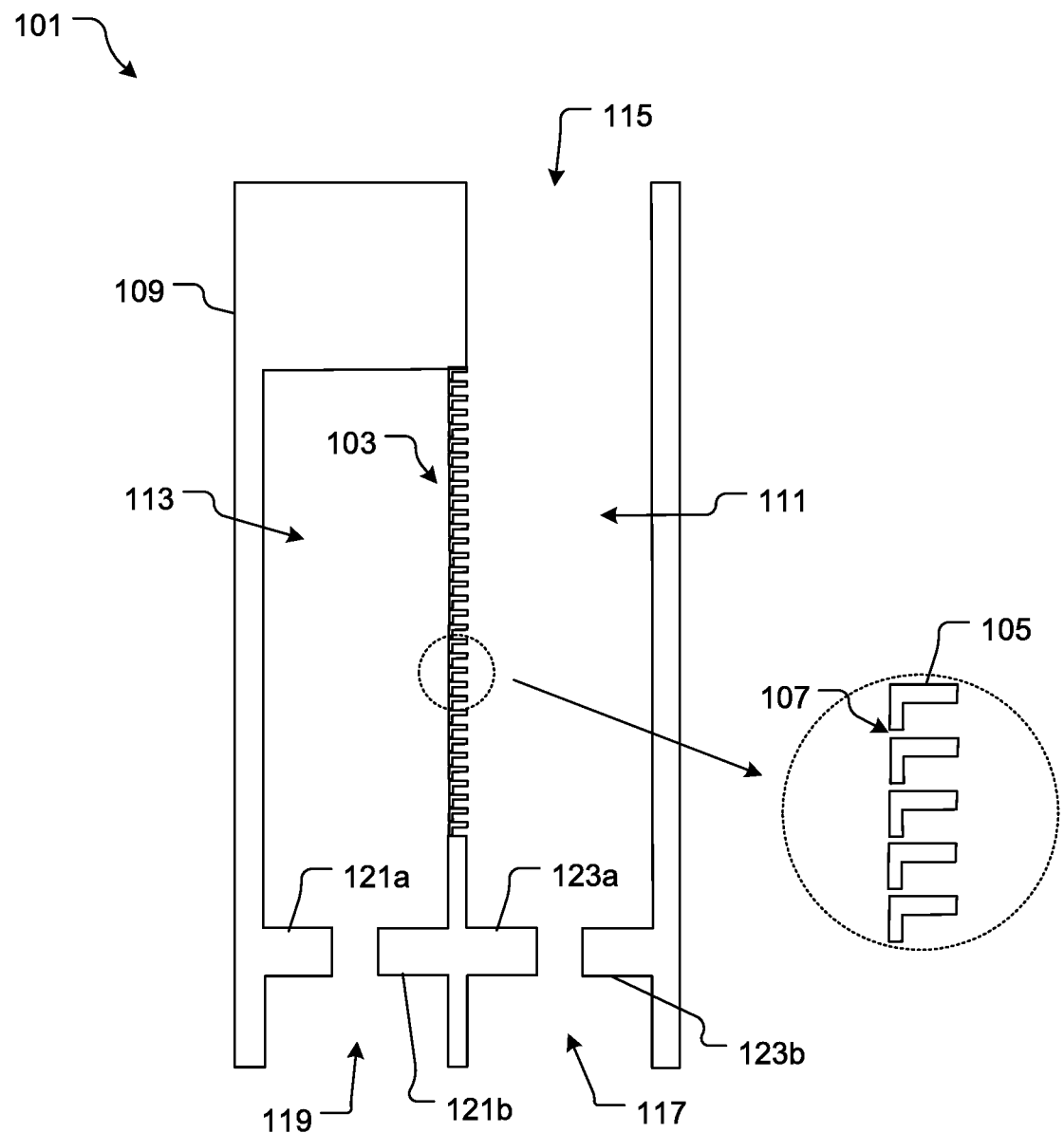
FIG. 1 is a side cross sectional view of a filtration system in accordance with a first embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional filtration systems. Specifically, the present invention provides for an improved filtration system that reduces the clogging of pores and increases filtration efficiency. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a side cross sectional view of a filtration system 101 in accordance with a first embodiment of the present application. It will be appreciated that system 101, as well as the alternatives discussed herein, overcomes one or more of the above-listed problems commonly associated with conventional filtration systems.

In the contemplated embodiment, system 101 includes a filtration device 103 with a plurality of filter cavities 105 aligned in linear array. The filter cavities 105 create cavities and pores 107 through which fluid can pass through. It should be appreciated that the pores can vary in size based on the particle size the user desires to filter out of the fluid. In this particular embodiment, the filter cavities 105 are L shaped, however, it should be appreciated that alternative shapes could be utilized.

Filtration device 103 is positioned within a fluid flow chamber 109 between a filtration channel 111 and filtrate channel 113 such that the filtration device 103 will filter fluid that passes therebetween. Fluid flow chamber 109 further includes an inlet 115 into filtration channel 111, an expulsion channel 117, and a filtrate channel outlet 119.

It should be appreciated that one of the unique features believed characteristic of the present application is the incorporation of one or more pressure modulating structures in fluid communication with the fluid flow chamber. In FIG. 1, this feature is demonstrated with a first constriction 121a-b, and a second constriction 123a-b. The first constriction extending into filtrate outlet 119 and the second constriction extending into expulsion channel 117. More precise measurements will be provided herein, however, FIG. 1 is provided to demonstrate a first filtration device and a first hydrodynamic resistance structure as contemplated in the present invention.

Figure 2:
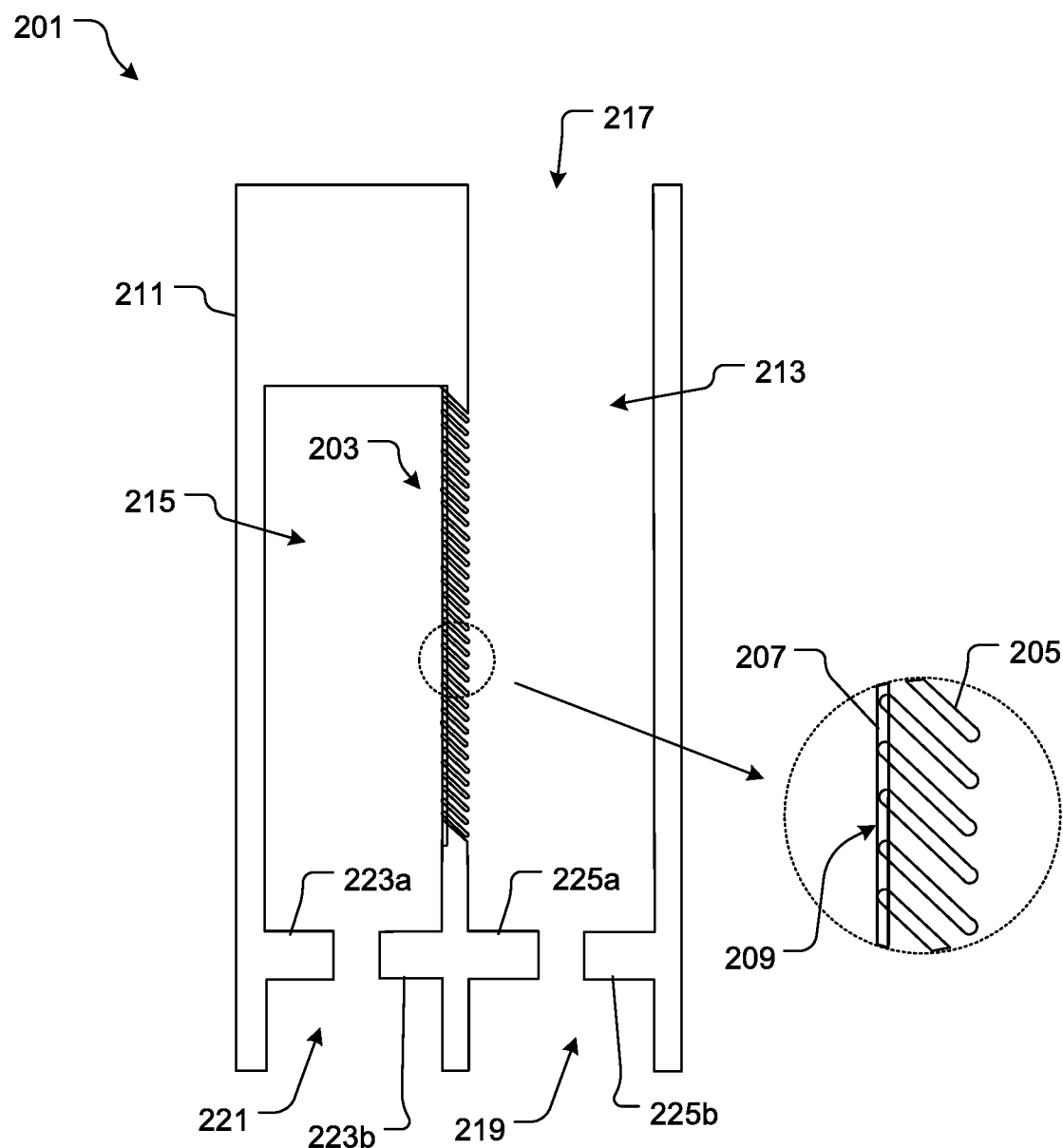
FIG. 2 is a side cross sectional view of a filtration system in accordance with an alternative embodiment of the present application.

In FIG. 2, an alternative embodiment of a filtration system 201 is shown being similar in form and function to system 101. It should be appreciated that the features of the various embodiments discussed herein can be interchanged and incorporated into one another, thereby creating alternative systems within the disclosure and teachings of the present invention. System 201 includes a filtration device 203 having a plurality of filtration slats 205 arranged in linear array and connected via a supporting structure 207. In this embodiment, the filtration slats 205 are arranged in a parallel manner and at an angle relative to the support structure 207. This system further includes pores 209 configured to alter the flow pattern and remove particles from the liquid based on the particle size. FIG. 2 further includes a fluid flow chamber 211 with a filtration channel 213, a filtrate channel 215, an inlet 217, an expulsion channel 219, and an outlet 221 as discussed in connection with FIG. 1. System 201 further includes first and second constraints 223, 225 as described above.

Figure 3:
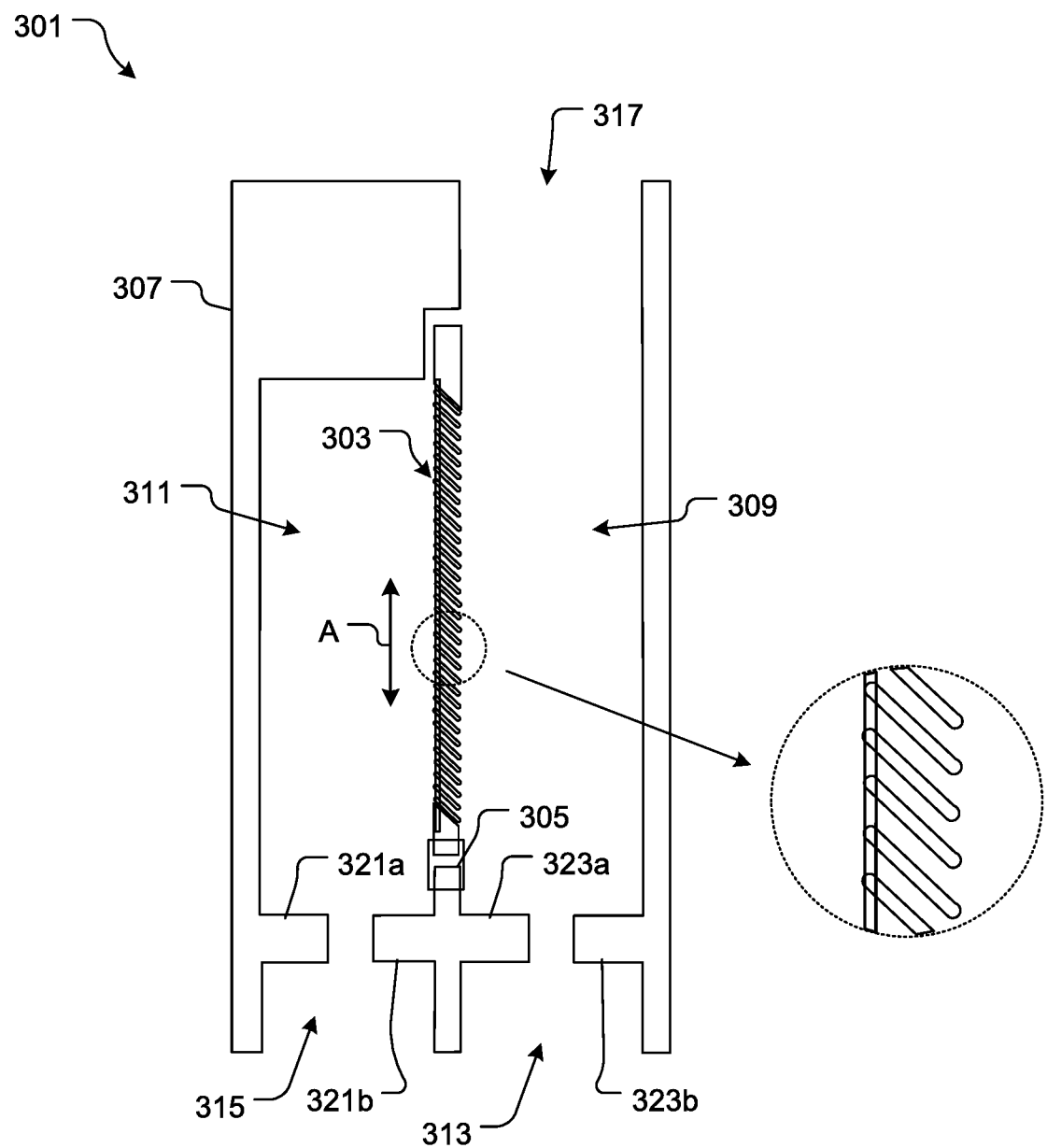
FIG. 3 is a side cross sectional view of a filtration system in accordance with an alternative embodiment of the present application.

In FIG. 3, an alternative embodiment of a filtration system 301 is shown. Again, it should be appreciated and understood that the features discussed in connection with each alternative embodiment can be interchanged throughout the embodiments. System 301 includes a filtration device 303, which can be similar to device 103 and/or 203, wherein filtration device 303 is connected to an actuator 305, such that the actuator is configured to move (A) the filtration device 303 relative to the fluid flow chamber 307. This feature can improve filtration efficiency. System 301 includes the other features discussed above, including the fluid flow chamber 307 with a filtration channel 309, filtrate channel 311, expulsion channel 313, filtrate channel outlet 315, inlet 317, and constrictions 321, 323. It should be appreciated that the actuator can vary in location of attachment, and can vary in type, including one or more of a solenoid motor, a piezoelectric crystal motor, or a pneumatic reciprocating circuit motor.

Figure 4:
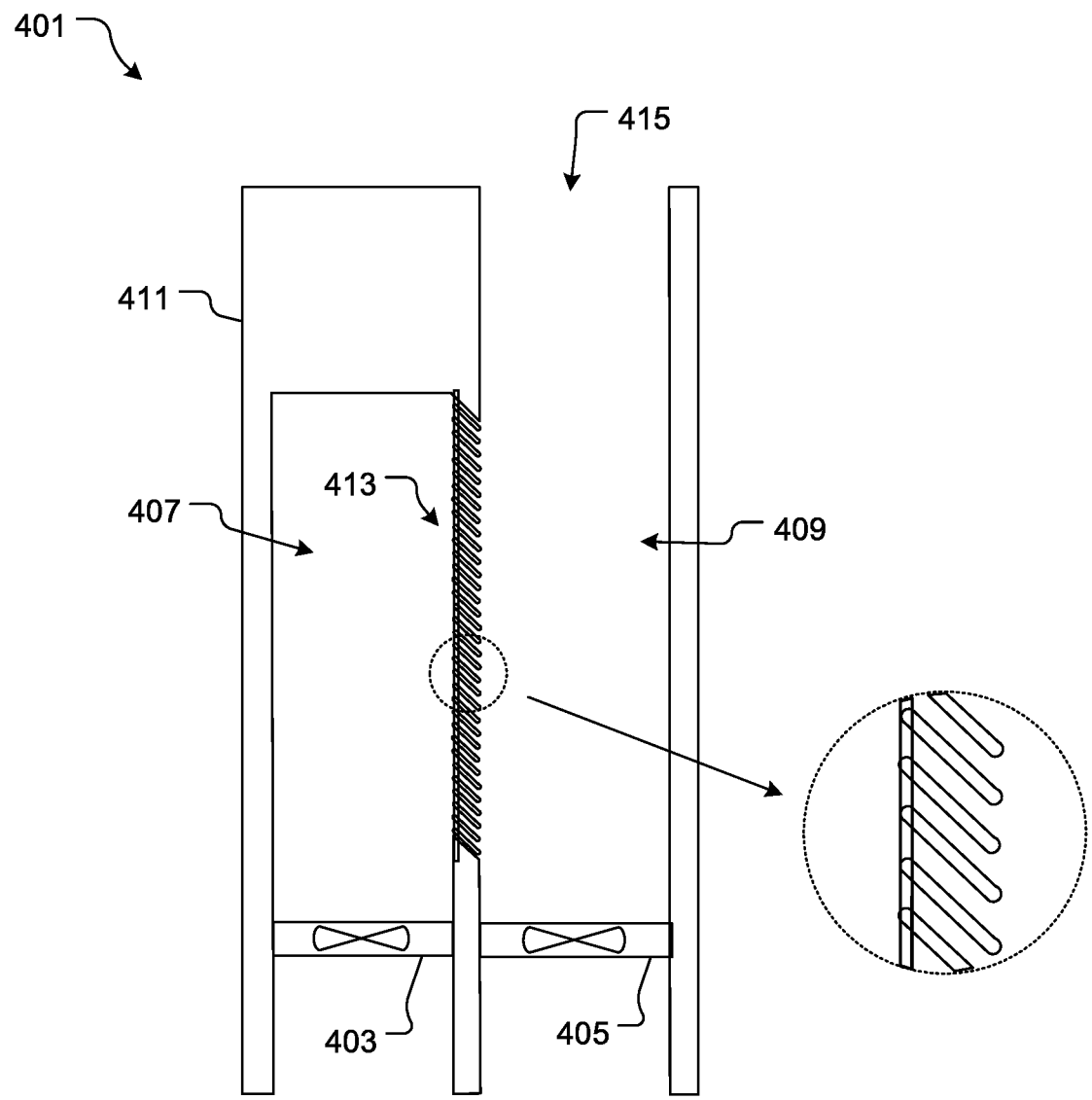
FIG. 4 is a side cross sectional view of a filtration system in accordance with an alternative embodiment of the present application.

In FIG. 4, another alternative embodiment of a filtration system 401 is shown. In this embodiment, the system 401 includes a first pump 403 and a second pump 405 in communication with a filtrate channel 407 and a filtration channel 409. It should be appreciated that the first and second pumps replace the constrictions discussed above to provide the one or more pressure modulating structures in fluid communication with the fluid flow chamber 411. System 401 includes filtration device 413, which can be similar to filtration devices 103, 203 discussed above and includes inlet 415. Again, it must be understood that the features of each system can be interchanged to create alternative systems, for example, a filtration system having one or more pumps, an actuator, and filtration device 103 having filtration cavities, could easily be created with the teachings herein.

Figure 5:
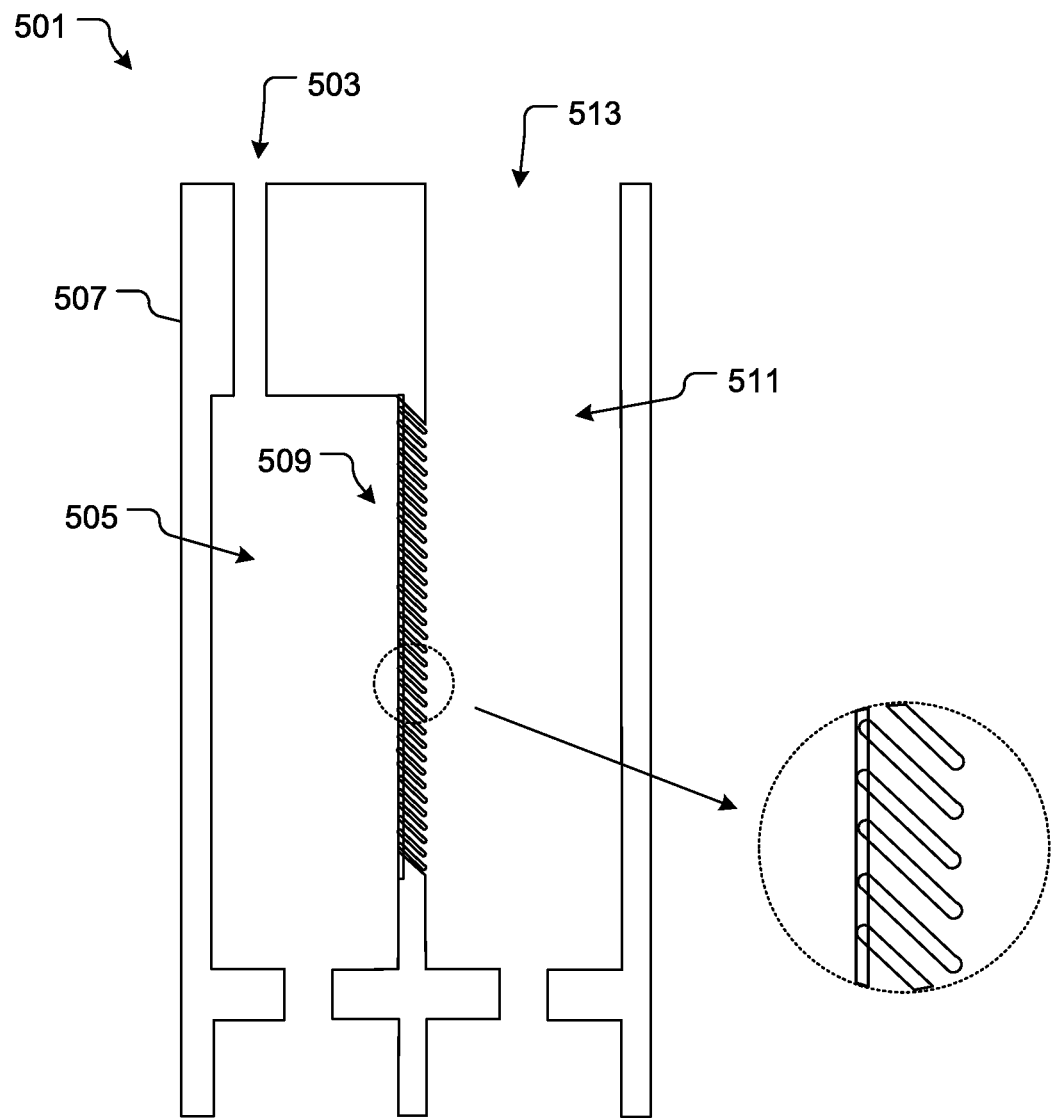
FIG. 5 is a side cross sectional view of a filtration system in accordance with an alternative embodiment of the present application.

In FIG. 5, another alternative embodiment of a filtration system 501 is shown. Filtration system 501 can include any of the features discussed herein, and further includes a flushing inlet 503 into filtrate channel 505, the flushing inlet configured to provide a means to flush the filtrate channel upstream of the filter pores. Filtration system 501 further including the fluid flow chamber 507, filtration device 509, filtration channel 511, and inlet 513.

Figure 6:
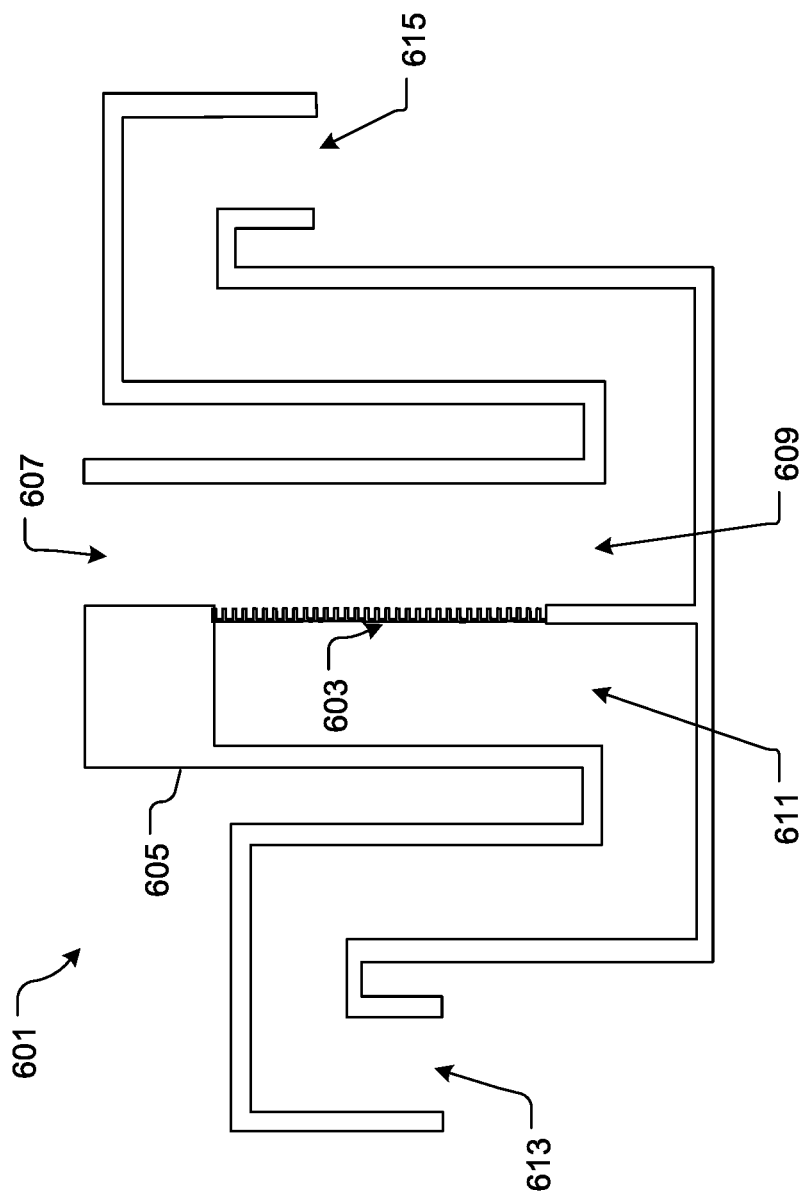
FIG. 6 is a side cross sectional view of a filtration system in accordance with an alternative embodiment of the present application.

In FIG. 6, another pressure modulating structure is shown. Filtration system 601 includes fluid flow chamber 605 with a filtration device 603 secured between a filtration channel 609 with an inlet 607 and a filtrate channel 611. This system utilizes an elevation difference between a first outlet 613 and a second outlet 615 and allowing the fluid to overflow. This overflow will produce the pressure difference similar to the pump and/or constriction described above.

Figure 7A:
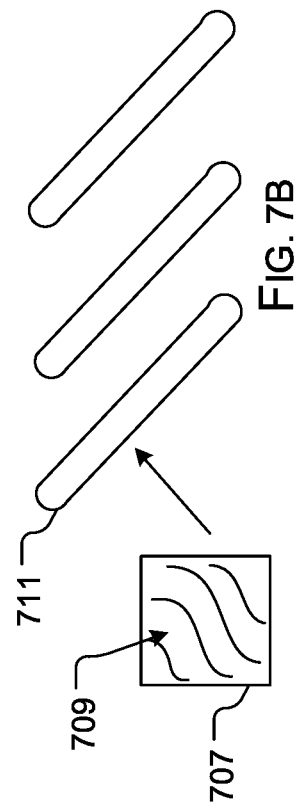
FIGS. 7A-7D are simplified examples of modifications to filtration structures of the various embodiments of the filtration system of the present invention.
Figure 7B:
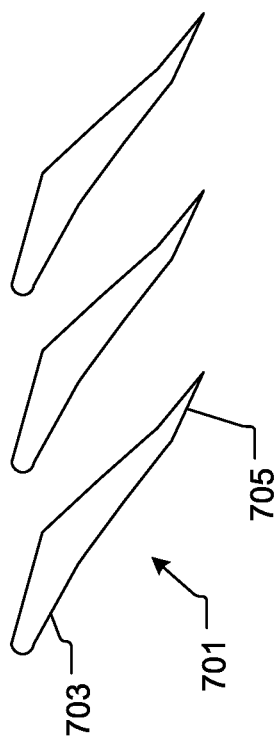
Figure 7C:
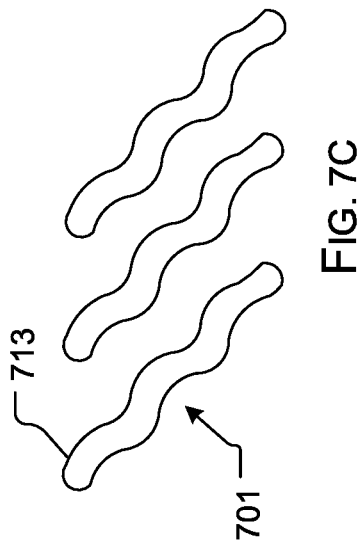
Figure 7D:
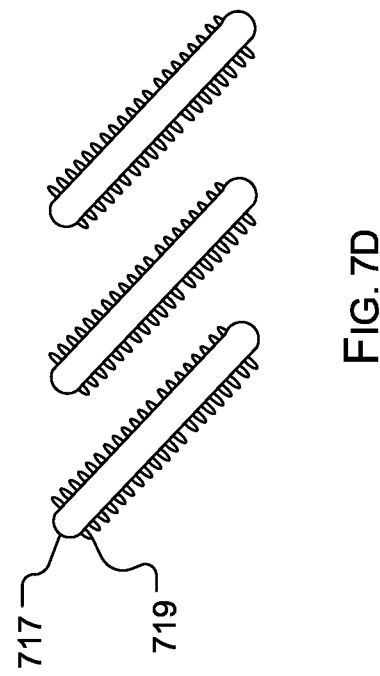

In FIGS. 7A-7D, various views of filtration slats are shown to depict variations that are contemplated to incorporate into the slats. It should be appreciated that the filtration structures of the various embodiments, including the slats and the cavities can include the features discussed herein, as well as other features, and the FIGS. 7A-7D are shown merely by way of example and are not intended to be limiting to the alterations that could be made. In FIG. 7A, one embodiment is shown, wherein each filter slat 701 includes a first angled portion 703 and a second angled portion 705. In FIG. 7B, cutout 707 illustrates a surface treatment 709 that could be incorporated onto any of the surfaces of slat 711. The surface treatment 709 can vary, but in one particular embodiment the surface treatment creates a rough surface. In FIG. 7C, the filter slats 713 are shown having curved/wave like surfaces 715. In FIG. 7D, the filter slats 717 are shown having one or more protrusions 719. It should be appreciated that in this embodiment, the protrusions can be segregated to one end, one side, or can extend the entire length of both sides.

Figure 8:
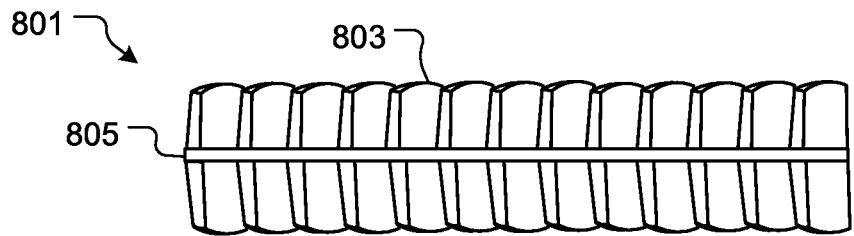
FIG. 8 is a top view of a filtration device of the filtration system of FIG. 2.
Figure 9:
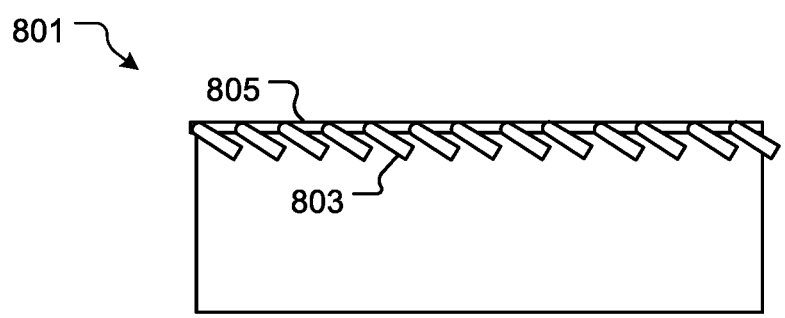
FIG. 9 is a side view of the filtration device of FIG. 7.

In FIG. 8, a top view of a filtration device 801 is shown, filtration device 801 having a plurality of slats 803 extending away from a support 805. It should be appreciated that the filtration device 801 can be manufactured via a variety of means, including three-dimensional printing or the like.

Further, the materials can vary and the size, shape, and orientation of the slats can vary as desired to filter particles from the liquid.

Figure 10:
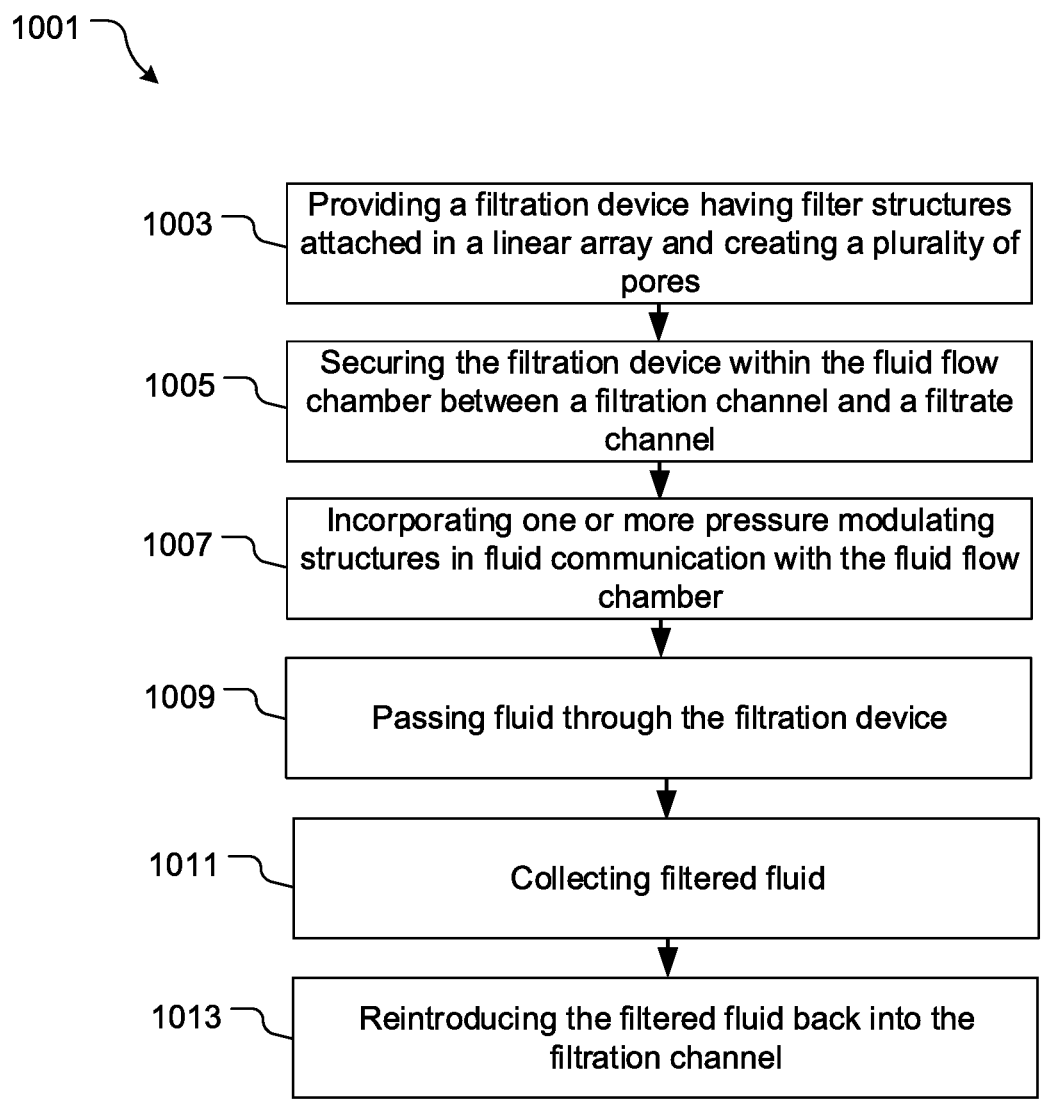
FIG. 10 is a flowchart of the method of filtration achieved via the various embodiments of the filtration systems of the present invention.

In FIG. 10, a flowchart 1001 depicts the method of filtration as achieved via the various systems discussed herein. As shown, a filtration device is selected and provided, the filtration device having a plurality of filtration structures that filter particles of a predetermined size, as shown with box 1003. The filtration device is secured within a fluid flow chamber between a filtration channel and a filtrate channel, the securing can include the incorporation of an actuator as desired by the user, as shown with box 1005. One or more pressure modulating structures are secured to be in fluid communication with the fluid flow chamber such that the pressure modulating structures control the pressure difference between the filtration and filtrate channel, as shown with box 1007. Fluid is passed through the fluid flow chamber, wherein the filtered fluid is collected, as shown with boxes 1009, 1011. If desired by the user, the filtered fluid is reintroduced back into the filtration channel, as shown with box 1013. It should be appreciated that multiple filtration devices can be used as desired.

Again, it should be appreciated that one of the unique features believed characteristic of the present invention is the use of the pressure modulating structure. As discussed, a plurality of contemplated structures includes the constrictions, the pumps, and the elevation difference described above.

In one embodiment, the constriction and/or pump modifies the pressure of the fluid flow chamber. The constriction and/or pump is positioned within the expulsion or filtrate channel and increases or decreases the pressure in the channel, and/or a conduit attached to either the expulsion or the filtrate channel and produces a difference in the pressure of the filtration and filtrate channel outlets, such that $0<\alpha<0.3$, where $$\alpha = \frac{A_t \; R_x \; P_f}{A_c \; R_f \; P_x}.$$

In this equation, At is the cross-sectional area of the filtration channel, Ac is the cross-sectional area of the filtration surface (e.g., filter slats, filter cavity), Rx is the average hydrodynamic resistance of the fluid paths from the intake to the expulsion channel, Rf is the average hydrodynamic resistance of the fluid paths from the intake to filtrate channel, Px is the pressure difference between the intake and expulsion channels, and Pf is the pressure difference between the intake and filtrate channels.

The systems of the present inventions can be utilized with various fluids, one specific fluid medium having a viscosity μ, and density ρ, such that $10<\beta<5000$, where $$\beta = \frac{\rho \; L \; P_x}{\mu \; A_t \; R_x},$$

such that L is the spacing between the filter slats or the maximum dimension in the direction of fluid flow of the cavity in the filter cavity filter device.

In the systems that utilize an actuator for movement of the filter device, the actuator is configured to produce movement around the filter slats relative to the surrounding fluid, such that $0<\alpha<0.3$, where $$\alpha = \frac{P_f}{A_c \; R_f \; U},$$

where U is the translational velocity produced by the actuator. In this embodiment, the fluid medium has a viscosity μ, and density ρ, such that $10<\beta<5000$, where $$\beta = \frac{\rho \; L \; U}{\mu},$$

and L is the spacing between the filter slats or the maximum dimension of the cavity in the direction of the flow.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A filtration system, comprising:
   a filtration device having:
   a plurality of filter slats positioned in a linear array and connected via a supporting structure, the plurality of filter slats being parallel to one another and being fixed at an angle relative to the linear array; and
   a plurality of pores created by the plurality of filter slats;
   each of the plurality of filter slats having a first side with a projection forming a first apex and a second side with an abrupt bend forming a second apex;
   the first apex formed by a first surface and a second surface defining an obtuse angle, and the second apex formed by the second surface and a third surface defining an acute angle;
   wherein a maximum constriction in a pore between a filter slat and an adjacent filter slat spans from the first apex to the second apex;
   a fluid flow chamber configured to hold the filtration device such that fluid passes through the filtration device, the fluid flow chamber having:
   a filtration channel with an inlet to receive fluid and an expulsion channel in fluid communication with the filtration channel;
   a filtrate channel in fluid communication with the filtration channel such that fluid passes through the filtration device between the filtration channel and the filtrate channel, the filtrate channel having a filtrate channel outlet;
   one or more pressure modulating structures in fluid communication with the fluid flow chamber such that the one or more pressure modulating structures modify pressure in the fluid flow chamber.

2. The system of claim 1, wherein the one or more pressure modulating structures comprise:
   one or more filtrate constrictions extending into the filtrate channel outlet; and
   one or more expulsion constrictions extending into the expulsion channel;
   wherein the one or more filtrate constrictions and one or more expulsion constrictions alter pressure within the filtration channel and the filtrate channel.

3. The system of claim 2, further comprising a first wall extending from the filtrate channel to and beyond the filtrate constriction, and a second wall extending from the filtration channel to and beyond the expulsion constriction, such that a first common cross-sectional geometry is located upstream of the filtrate constriction, downstream of the filtrate constriction, and at a location of the plurality of filter slats and a second common cross-sectional geometry is located upstream of the expulsion constriction, downstream of the expulsion constriction, and at a location of the plurality of filter slats.

4. The system of claim 2, wherein the filtrate constriction and expulsion constriction are positioned in a parallel arrangement.

5. The system of claim 1, wherein the one or more pressure modulating structures comprise:
   a first pump positioned within the expulsion channel; and
   a second pump positioned within the filtrate channel outlet;
   wherein the first and second pumps alter pressure within the filtration channel and the filtrate channel.

6. The system of claim 1, wherein the one or more pressure modulating structures are a first outlet in fluid communication with the filtrate channel and a second outlet in fluid communication with the filtration channel, the first and second outlets positioned at two different elevations.

7. The system of claim 1, further comprising:
   an actuator connected to the filtration device, wherein the actuator is configured to move the filtration device relative to the fluid flow chamber.

8. The system of claim 1, wherein each of the plurality of filter slats includes a surface treatment.

9. The system of claim 1, further comprising:
   a second filtration device in fluid communication with the fluid flow chamber.

10. The system of claim 1, further comprising:
    a flushing inlet extending into the filtrate channel and configured to provide a means to flush the filtrate channel upstream of the plurality of pores.

11. The system of claim 1, further comprising a first substantially linear portion and a second substantially linear portion which form the first apex.

12. The system of claim 1, wherein the first apex forms a substantially pointed projection.

13. The system of claim 1, wherein the abrupt bend of the second apex has a rounded shape, with a substantially linear extension on each side of the rounded shape.

14. The system of claim 1, wherein each of the plurality of filter slats further has a first end and a second end, and a first surface extending from the first apex toward the first end and a second surface extending from the first apex toward the second end.

15. The system of claim 14, wherein one of the first surface and the second surface extends from the first apex against a direction of flow, and one of the first surface and the second surface extends from the first apex with the direction of flow, the direction of flow extending from the inlet of the filtration channel to the expulsion channel.

16. A filtration system, comprising:
    a filtration device having:
       a plurality of filter slats positioned in a linear array;
       a plurality of pores created by the plurality of filter slats;
       each of the plurality of filter slats having a first side with a projection forming a first apex and a second side with an abrupt bend forming a second apex;
       the first apex formed by a first two surfaces defining an obtuse angle, and the second apex formed by a second two surfaces defining an acute angle, the second apex at a terminal end closest to a filtration channel;
       wherein a maximum constriction in a pore between a filter slat and an adjacent filter slat spans from the first apex to the second apex;
    a fluid flow chamber configured to hold the filtration device such that fluid passes through the filtration device, the fluid flow chamber having:
       the filtration channel with an inlet to receive fluid and an expulsion channel in fluid communication with the filtration channel;
       a filtrate channel in fluid communication with the filtration channel such that fluid passes through the filtration device between the filtration channel and the filtrate channel, the filtrate channel having a filtrate channel outlet;
    one or more pressure modulating structures in fluid communication with the fluid flow chamber such that the one or more pressure modulating structures modifies pressure in the fluid flow chamber.

17. A method for removing particles from a fluid, the method comprising:
    providing a filtration device, the filtration device having a plurality of filter slats attached in a linear array, the plurality of filter slats creating a plurality of pores; each of the plurality of filter slats having a first side with a projection forming a first apex and a second side with an abrupt bend forming a second apex; the first apex formed by a first surface and a second surface defining an obtuse angle, and the second apex formed by a the second surface and a third surface defining an acute angle; and wherein a maximum constriction in a pore between a filter slat and an adjacent filter slat spans from the first apex to the second apex;
    securing the filtration device within a fluid flow chamber, the fluid flow chamber having a filtration channel with an inlet to receive fluid and an expulsion channel in fluid communication with the filtration channel, a filtrate channel in fluid communication with the filtration channel such that fluid passes through the filtration device between the filtration channel and the filtrate channel, the filtrate channel having a filtrate channel outlet;
    incorporating one or more pressure modulating structures in fluid communication with the fluid flow chamber such that the pressure modulating structure modifies pressure in the fluid flow chamber;
    passing fluid through the filtration device such that particles of a pre-determined size are excluded via the filtration device; and
    collecting a filtered fluid from the filtrate channel.

18. The method of claim 17, further comprising:
    reintroducing the filtered fluid back into the filtration channel through the intake.

19. The method of claim 17, further comprising:
 positioning a second filtration device in fluid communication with the fluid flow chamber.

\* \* \* \* \*